Figure 1:
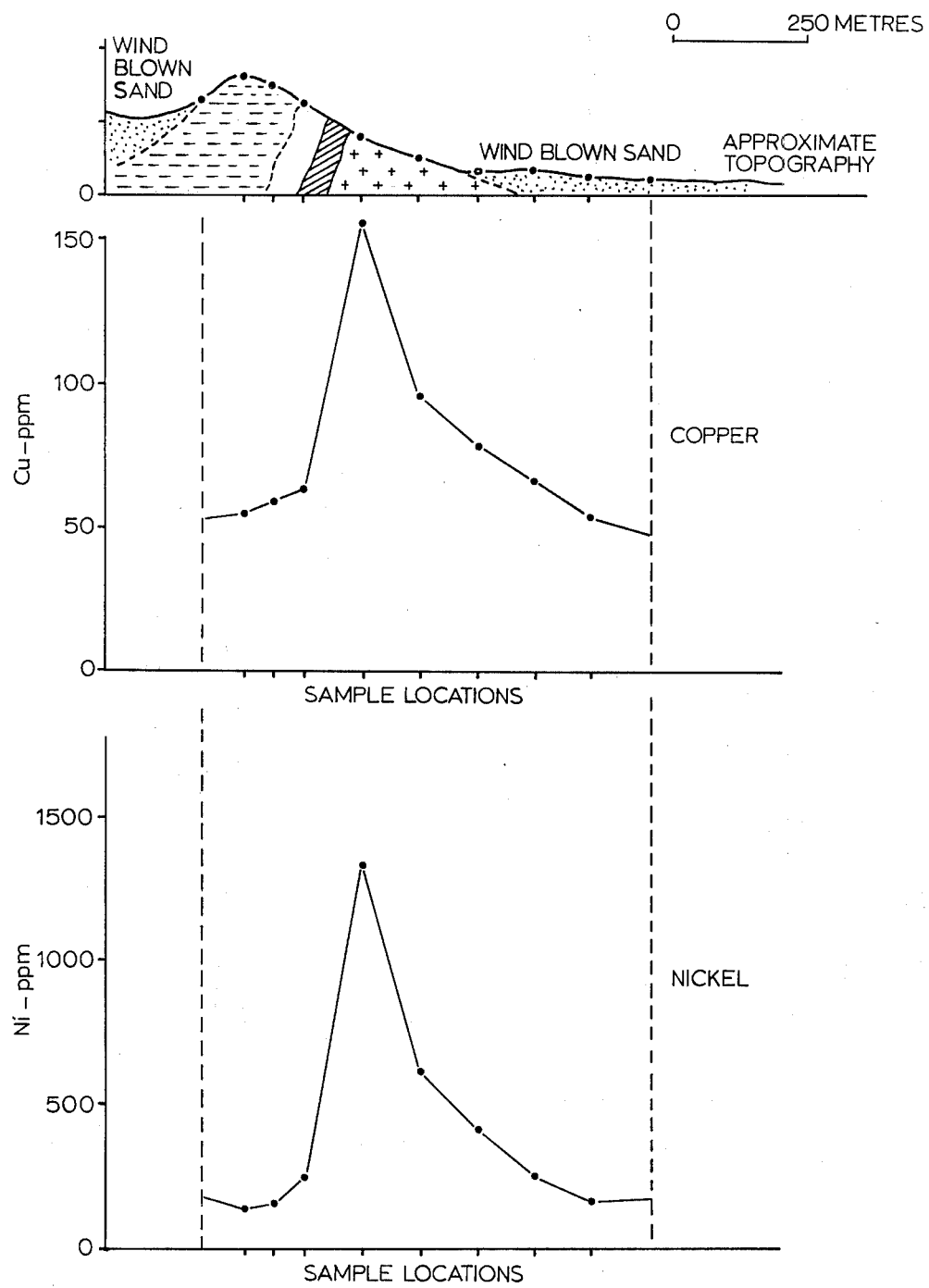

United States Patent [19]

Barringer

[11] 4,056,969
[45] Nov. 8, 1977

[54] DETECTION OF CONCEALED METALLIFEROUS DEPOSITS, HYDROCARBONS AND EXPLOSIVES

[75] Inventor: Anthony Rene Barringer, Willowdale, Canada

[73] Assignee: Barringer Research Limited, Rexdale, Canada

[21] Appl. No.: 679,622

[22] Filed: Apr. 23, 1976

[30] Foreign Application Priority Data

Apr. 28, 1975 Canada .................................. 225851

[51] Int. Cl.² .................. B01D 46/00; C12K 1/04; G01N 33/00; G01V 5/00
[52] U.S. Cl. .................... 73/28; 23/230 EP; 23/254 R; 55/270; 195/103.5 M; 195/103.5 P; 195/127; 250/255
[58] Field of Search .......... 23/230 EP, 232 R, 254 R; 73/28, 421.5 R, 425.4 R, 425.6; 250/253, 255, 301, 432, 435; 55/270; 195/103.5 P, 127, 103.5 M

[56] References Cited

U.S. PATENT DOCUMENTS

| 2,257,170 | 9/1941 | Howell .................... 23/230 EP UX |
| 2,261,764 | 11/1941 | Horvitz .................... 23/230 EP UX |
| 2,918,579 | 12/1959 | Slobod et al. ............... 23/230 EP X |
| 3,364,727 | 1/1968 | Heath ........................ 73/23 |
| 3,554,005 | 1/1971 | Koblin et al. ............. 73/28 |
| 3,690,837 | 9/1972 | Witz et al. ..................... 23/232 R X |
| 3,730,683 | 5/1973 | Milly ............................... 23/230 EP |
| 3,759,617 | 9/1973 | Barringer ..................... 23/230 EP X |
| 3,768,302 | 10/1973 | Barringer ..................... 23/230 EP X |
| 3,949,594 | 4/1976 | Treaftis et al. ................ 73/28 |

*Primary Examiner*—Joseph Scovronek
*Attorney, Agent, or Firm*—Rogers, Bereskin & Parr

[57] ABSTRACT

A method and apparatus for geochemical exploration for mineral, hydrocarbon and geothermal deposits in which particles which are contained in the very surface, or surficial layer of the earth, or of vegetation, or water are collected and analyzed.

3 Claims, 9 Drawing Figures

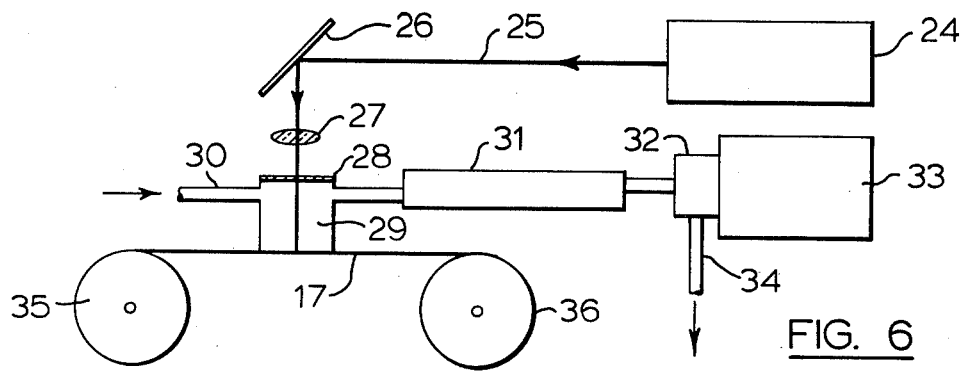
FIG. 6
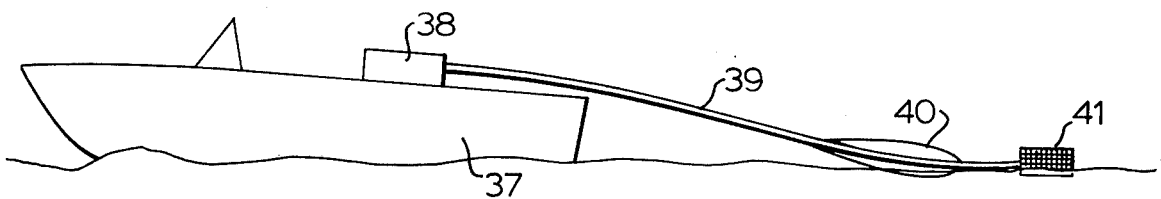
FIG. 7
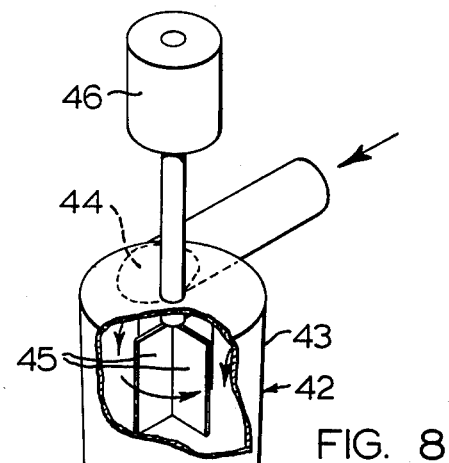
FIG. 8
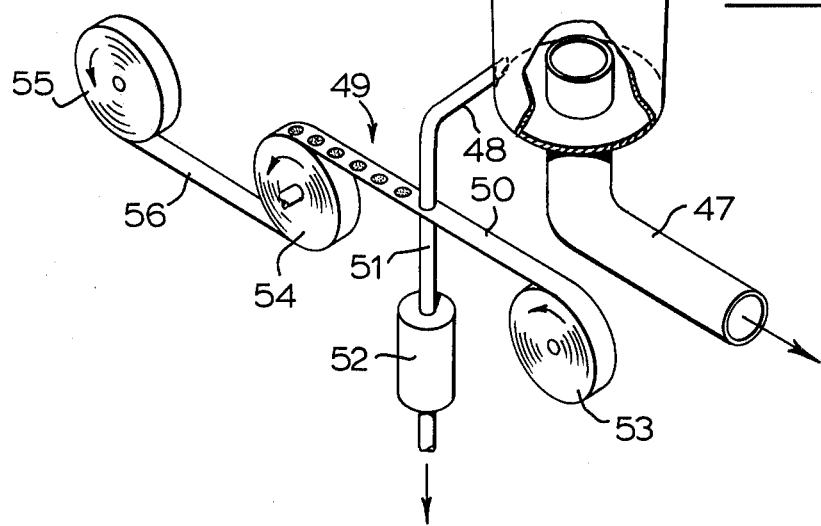

DETECTION OF CONCEALED METALLIFEROUS DEPOSITS, HYDROCARBONS AND EXPLOSIVES

This invention relates to a novel method and apparatus for geochemical exploration for mineral, hydrocarbon and geothermal deposits.

In conventional geochemical prospecting, samples of rock, soil, vegetation, stream sediments or water are collected and such samples are analyzed for predetermined elements for the purpose of revealing anomalous geochemical distributions of such elements, related to mineralization or the existence of hydrocarbon deposits. Commonly, the samples are taken in soil at depths of between about 10 cm.–1 m. When samples are taken nearer to the surface it is usual to discard the top 1 to 2 cm. layer of the soil on the theory that the very surface may be contaminated to some extent, due for example to the presence of animals or deposition of wind swept material. In addition, the collection, storage and analysis of a large number of samples is very time consuming and expensive, so that at present it is practical to take samples only at fairly wide spaced intervals. As a result, it is often difficult to assess the significance of some apparent geochemical anomalies.

In the present invention, contrary to conventional practice, it is particulates which are contained in the very surface, or surficial layer of the earth, or of vegetation, or water that are collected and analyzed. Samples of the surficial layer are taken rapidly, in quick succession, and at relatively low cost. More particularly, particulate or finely divided material comprising the surficial layer of soil, vegetation or water, such as mineral grains, clay minerals, saline evaporative residues, plant fragments, micro-organisms and the like are sampled, for example by applying suction to a tube positioned near to the surface to be sampled, and preferably depositing the particulate or finely divided material which is drawn up by suction through the tube, onto a suitable collection surface such as a tape that is adapted to be moved step-wise or else continuously past a collection station, whereby the collected material may be stored for subsequent analysis. Alternatively, or in addition, at least some of the more easily volatized elements and compounds such as mercury, iodine and hydrocarbons may be analyzed immediately after the particulates are collected, for example by using apparatus as shown in U.S. Pat. No. 3,868,222 of A. R. Barringer. Preferably, prior to the deposition of the particles on the tape, the material is graded in size and only the large particles are collected, the remainder being discarded as the smaller particles are more likely than the larger particles to have migrated a considerable distance due to wind.

The geochemical basis of the invention can be illustrated by an example of a surface dust traverse carried out across a known mineral deposit. Samples of approximately the top millimeter of dust were collected at 105 meter intervals across the well known copper-nickel-sulphide deposit in Western Austrailia known as Poseidon, Mt. Windarra orebody. This deposit, which contains more than 4.2 million tons of nickel does not outcrop at the surface at the line of traverse. The collected samples were sieved through a nylon screen to exclude all coarse, sand sized material and ensure that the sample was confined to dust material only. Copper and nickel were extracted with perchloric acid and analyzed by standard atomic absorption techniques. The analyses in relation to the mineral deposit are shown in FIG. 1. It will be noted that a strong anomaly in both nickel and copper is obtained over the deposit. Similar results have been obtained in tests over a number of other deposits. Thus it is apparent that the invention has considerable potential in the field of exploration for metalliferous deposits.

An important feature of surface particulate material is the occurrence of abundant populations of micro-organisms such as bacteria, which tend to utilize those nutrients naturally occurring in gas seepages from the ground such as methane and ethane associated with oil and gas fields. Such micro-organisms can be identified by micro-biological culturing techniques. In addition, such micro-organisms produce quantities of metabolic by-products which have identifiable characteristics. Thus in the presence of a natural hydrocarbon gas seepage through a surface soil there is an abundant accumulation of lipids, and paraffinic hydrocarbons which greatly increase the volatile organic content of the soil. It has been discovered that traces of metabolic by-products from ethane and methane utilizing bacteria are strongly developed in approximately the top millimeter of surface dust and can be identified with the appropriate analytical techniques. Thus the collection and analysis of the surficial particulate material is of value in exploration for hydrocarbon accumulations.

In addition to the foregoing, surface particulate materials exhibit an adsorptive capacity for gases and volatile materials emanating from the ground such as mercury vapour, iodine vapour, hydrogen sulphide, sulphur dioxide, methane, ethane, propane and volatile organic materials of biological origin. These gases are often associated with mineral, geothermal or oil accumulations and therefore their surface emanations tend to be an indicator of sub-surface economic deposits.

Not only has it been found that the very surface of the soil comprises particulate material that contains valuable geochemical information, but that all terrain surfaces including vegetation tend to be coated with particulate material which is related in composition to the chemistry of the underlying soils. Thus in the presence of the aforementioned oil seeps, not only are the surface soils covered with a dust layer that carries characteristic organic metabolites, but the vegetation in likewise covered. Much of this is surface dust which has been entrained from the surface soils under the vegetation but some of it appears to be indigenous and generated at the surface of the vegetation. Thus, samples of surficial particulate material removed from vegetation is of importance in both mineral and hydrocarbon exploration.

A related but somewhat different set of conditions exists over lake and ocean surfaces. Such surfaces are regions of intense microbiological activity particularly with respect to photo-synthetic organisms. Such organisms are strong accumulators of metals, iodine and hydrocarbon nutrients. A analysis of this surface particulate material, therefore, is indicative of underlying geochemical conditions. Thus in the case of a uranium deposit lying beneath a lake, uranium will be accumulated in the surface plankton as will the radiogenic lead associated with the radioactive decay of uranium within the deposit. Samples of particulate material collected from surface waters over a uranium deposit will therefore contain abnormal quantities of uranium, and anomalous ratios of the lead isotopes $Pb/207/Pb/206$. This lead isotopic ratio will have typical values in the vicinity of 0.9 in a Pre-Cambrian Shield area for example, whereas in the presence of uranium mineralization, the ratio can drop to 0.5 or sometimes even lower. Thus the isotopic analysis of surface particulate material can be a powerful indicator of the nearby presence of uranium deposits. Similarly in the presence of a copper orebody lying beneath a lake the surface particulate material will exhibit anomalous quantities of copper. In the case of hydrocarbon seeps into the ocean floor in offshore regions, intense microbiological activity occurs in the sea-water due to the supply of organic nutrient material arising from the sea floor. Small bubbles not only carry nutrients to the surface but also provide an agency for trapping bacteria and micro-particulate material and carrying it to the surface. Such a mechanism has been described in detail by Carlucci, A. G., and P. M. Williams, Concentration of Bacteria From Sea Water By Bubble Scavenging, J. Cons. Perma. Int. Explor. Mer, 30, 28–33, 1965. Surface particulate materials collected from the ocean over an oil or gas seep therefore carry characteristic bacteria and metabolites associated with the seep and can be used as a sensitive indicator of the presence of seeps.

Figure 2:
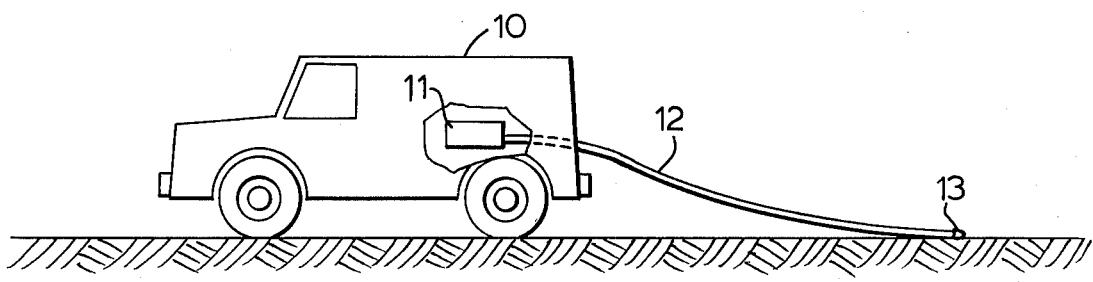
Figure 3:
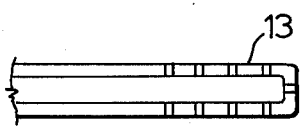
Figure 4:
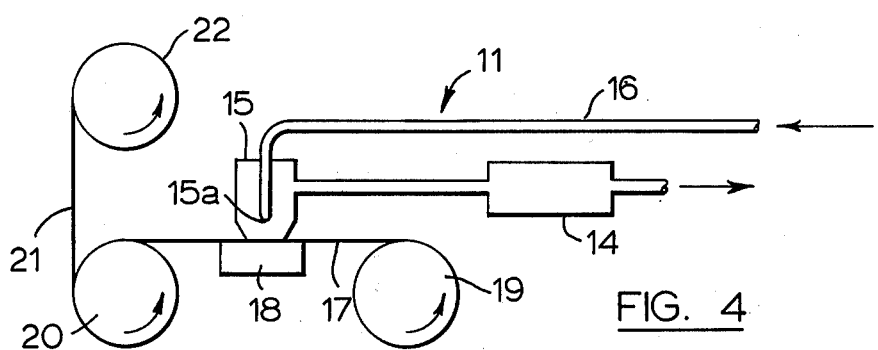
Figure 5:
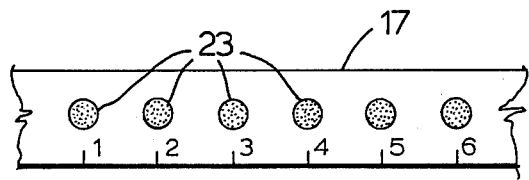
Figure 9:
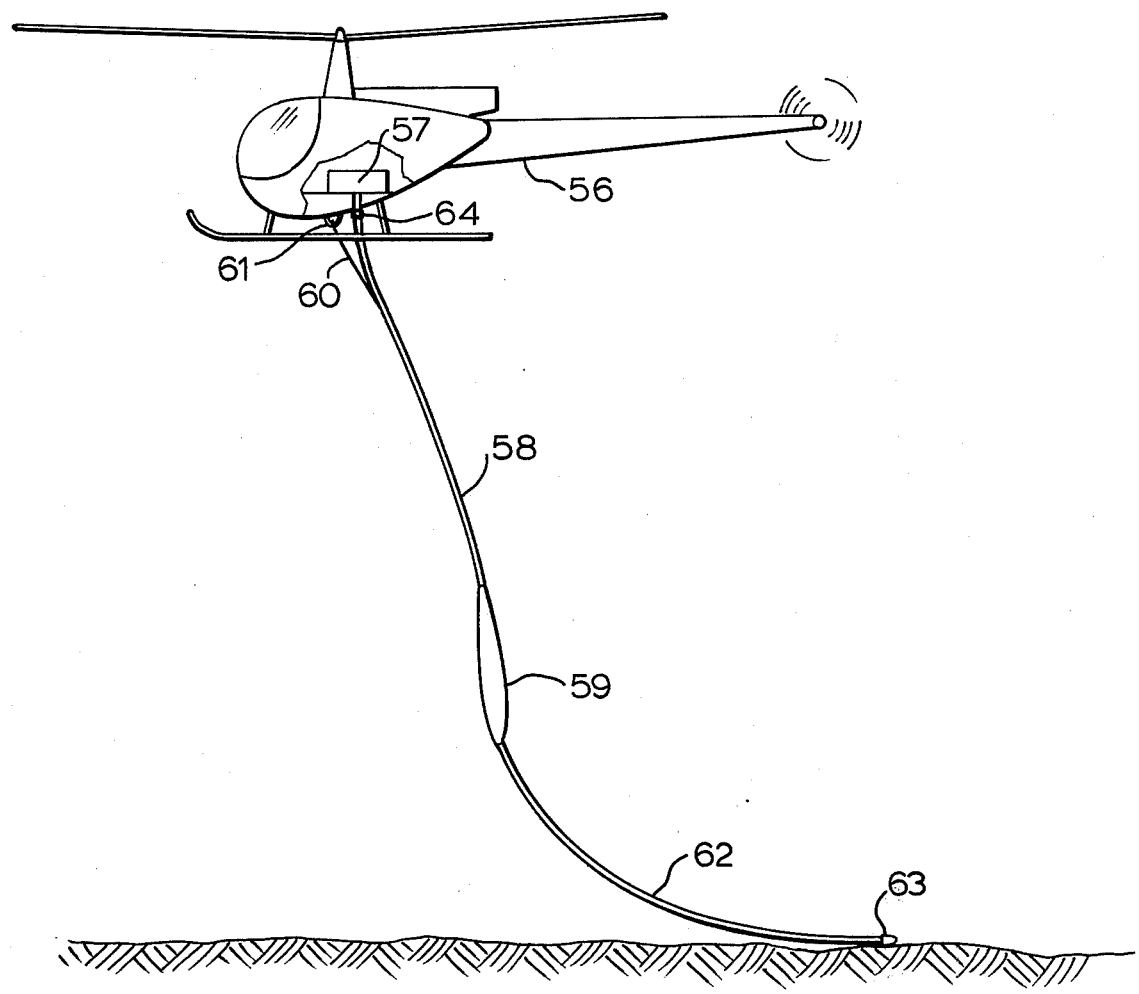

In the darwings,

FIG. 1 is a graphical view illustrating a survey traverse carried out over a metalliferous deposit in accordance with the invention, FIG. 2 is a diagrammatic view showing a land vehicle equipped with a suction tube in accordance with a first embodiment of the invention, FIG. 3 is a plan view showing in greater detail the outer end of the tube shown in FIG. 2, FIG. 4 is a diagrammatic view of a preferred form of apparatus for storing collected particulate material, FIG. 5 is a plan view showing a portion of tape used with the embodiment of FIG. 4, FIG. 6 is a diagrammatic view showing apparatus for analyzing particulate material collected on the tape of FIG. 5, FIG. 7 is a diagrammatic view showing a water craft equipped with a suction tube according to another embodiment of the invention, FIG. 8 is a diagrammatic view of apparatus for storing particulate material collected by means of the apparatus of FIG. 7, and FIG. 9 is a diagrammatic view showing an aircraft equipped with a suction tube according to yet another embodiment of the invention.

Referring to the drawings, and in particular to FIG. 2, apparatus according to a first embodiment of the invention is shown installed in a land vehicle 10 adapted for cross country traversing. The vehicle 10 is of rugged four wheel type suitable for operation over rough terrain. A vacuum pump sampling assembly 11 is supported on shock mounts in the back of the vehicle 10 and is connected to a strong flexible plastic tube 12 which is able to withstand to a reasonable extent the extensive wear encountered in trailing along the ground behind the vehicle. The tube 12 terminates in a removable meshed cup 13 as shown in FIG. 3. This meshed cup serves the function of sieving out very coarse particules and allowing only relatively fine particulates sucked off the surface of the ground to be passed up the pipe 12, i.e. material below about 200$\mu$ in size. The sampling assembly 11 is shown in FIG. 4 and it consists of a vacuum pump 14 which is connected to an inertial impaction device 15 which in turn is connected to the tube 12 by means of a pipe 16. The impaction device 15 is similar to that shown in U.S. Pat. No. 3,868,222 of A. R. Barringer. By positioning jet 15a of the impaction device 15 a short distance from the outer surface of collection tape 17, for example, 2–3 cm., the larger particles will tend to travel in a straight line to impact on the tape 17, but the smaller, lighter particles will be swept way with the air and will not reach the tape 17. The separation between the jet 15a and the tape 17 can be adjusted until most particulate material of a size below about 50 microns is discarded. Air in the pipe 16 carrying particulates is directed through the jet 15a against the surface of the tape 17 the outer surface of which is preferably coated with a suitable adhesive material such as silicone adhesive.

The tape 17 is supported by a block 18 to which is fixed a numbering device which prints a mark and a number on the inner or back side of the tape 17 each time the tape 17 is incrementally advanced. A supply of tape 17 is carried on a reel 19 which feeds the tape 17 past the inertial impaction device 15 onto a pickup reel 20. The adhesive surface of the tape 17 is covered with a cover tape 21 from reel 22. Tape 21 is made of a suitable plastic material which will not adhere strongly to the adhesive surface of the tape 17, such as that sold under the trade mark Teflon. The cover tape 21 protects the particulate samples prior to analysis.

The samples are collected as circular spots 23 on the surface of the tape 17 as shown in FIG. 5 and the tape 17 may be advanced incrementally at equal time periods such as every 10 seconds or equal distance intervals of traverse as determined by distance measuring equipment on the vehicle 10.

Several alternative methods of analysis of the particulates on the tape can be employed. For example, the spots 23 on the tape 17 may be bombarded with X-rays and secondary X-ray fluorescence may be detected with a lithium drifted germanium detector cooled to liquid nitrogen temperatures. Pulse height analysis of the pulses produced by the detector enables identification of the elements present in the spots 23 to be carried out. This method has the advantage of being non-destructive so the tape can be re-analyzed for additional elements at any time. The determination of concentration of elements may be obtained by ratioing the counts obtained for a given energy representing an element, against the Compton Scatter from the particles.

An alternative method of analysis is the use of leaching methods in which the spots 23 are treated with a suitable leaching liquid such as 0.5 normal HCl. After leaching for a standard period of time such as 2 minutes the sample drop is removed and analyzed by atomic absorption or by atomic emission methods. In the case of atomic emission techniques, the sample drop may be nebulized into a radio frequency plasma and the optical emission from the plasma may be passed to a spectrometer with multiple exit slits and photomultipliers. Each exit slit is positioned appropriately for a given element, and by such means it is possible to analyze simultaneously for large numbers of elements. The observation of element ratios allows for the detection of sub-surface mineral deposits. Thus in detecting a copper deposit, copper may be ratioed against a suitable reference element such as titanium or zirconium.

When analysis is carried out for indications of hydrocarbons, the spots 23 may be partially vaporized with a laser beam from an infra-red laser such as carbon dioxide laser whichis focused in sequence on each spot 23, and the gases thereby released are passed through a short gas chromatographic column into a hydrocarbon and sulphur detector. Gases emanating from the adhesive coating of the tape 17 are principally methane and ethane which pass rapidly through the chromatographic column, while heavier hydrocarbons emanating from organic materials in the surface soils pass through more slowly. The output of the chromatographic column is monitored with suitable gas chromatographic detectors such as flame ionization detectors for carbon and flame photometric detectors for sulphur. The first observed peak in the output of the column which is attributable to vapours emanating from the adhesive coating of the tape 17 is discarded and the heights of the subsequent peaks are recorded. The use of a short gas column provides for rapid analysis and relatively easy separation of the heavy molcular weight organics emanating from the soil and the light molecular weight organics emanating from the adhesive coating of the tape. A longer chromatographic column can be used in order to obtain a more detailed analysis of the organics, at the expense of analysis speed.

An alternative method of analysis of organics is to pass the gaseous effluent resulting from pyrolysis of the spots 23 through a short gas chromatographic column into a nuclear quadrupole mass spectrometer via a membrane gas chromatographic interface of conventional type. This enbles rapid detailed analysis of the organics to be obtained, using computer pattern recognition techniques applied to the output of the mass spectrometer.

FIG. 6 shows apparatus for analysis of the spots 23 using a laser and a mass spectrometer. A carbon dioxide infra-red laser 24 provides an infra-red beam 25, which is reflected off a mirror 26 through a focusing lens 27 which focuses the beam through a window 28 into a chamber 29. The chamber 29 is held against the outer surface of the tape 17. A carrier gas, which may be air, argon or helium, is fed into the chamber 29 and exits via a short gas chromatographic column 31. When the laser is fired using a pulse typically having an energy of 0.5 joules the organic material on the tape is pyrolysed and vaporised and is carried by the carrier gas through the chromatographic column 31 into a membrane interface 32. The membrane interface 32 comprises a silicone rubber membrane which allows organic vapours to pass through the membrane into the high vacuum region of a radio frequency quadrupole mass spectrometer 33. Residual carrier gas moves out through the exit pipe 34 to a pump (not shown) and the organic vapours passing through the membrane are ionized and analyzed inside the radio frequency quadrupole mass spectrometer 33. Signals corresponding to the first pulse of organic vapour released from the tape 17 which are atrributable at least in part to the adhesive on the tape 17 are discarded, and the analysis is carried out on the organic vapours arriving later at the mass spectrometer. This time separation technique enables metabolic by-products of hydrocarbon-consuming bacteria to be analyzed and identified without interference from organic components in the tape adhesive. The tape 17 may be stored on a feed reel 35 and taken up on a take up reel 36, which can be operated step-wise by any suitable mechanism. A geochemical survey may be carried out with the apparatus described above by systematic traverses across country, given suitable terrain. Automatic marking means as previously described, is employed on the tape 17 to provide fiducial marks and such marks are correlated against the position of the vehicle as indicated on topographic maps. Subsequent analytical processing of the tapes allows for the preparation of a geochemical map showing the presence of geochemical anomalies. These anomalies may be metallic anomalies relating to the presence of underlying mineral deposits, or organic anomalies relating to micro seepage of hydrocarbon gases over oil fields. The method may be also used to detect the presence of absorbed gases associated with geothermal regions, such gases being driven off the collection tape by means of laser pyrolysis and analyzed in a mass spectrometer as described or in other equivalent detection equipment, of suitable sensitivity. Of particular relevance to geothermal exploration is the presence of mercury and iodine in surface particulate material. Both these elements may readily be driven off the tape 17 by heating. Both elements are well suited for analysis at very high sensitivity in a radio frequency quadrupole mass spectrometer.

A marine embodiment of the invention is illustrated in FIGS. 7 and 8. In this embodiment a boat 37 has a sampling system 38 (described below) attached to a towed plastic tube 39. The plastic tube 39 is caused to float on the surface of the water by a buoyant sheath 40 at the surface of the water. The plastic tube 39 terminates in a filter sieve 41 (e.g. of about 80 mesh) to prevent the ingestion of coarse material.

In the sampling system 38 shown in FIG. 8, water drawn in to the pipe 39 is sucked into a combined pump and inertial separator 42. The water enters the cylindrical body 43 of the separator 42 tangentially at 44 and it is drawn in by rotating impeller blades 45 driven by a motor 46. The water forms a vortex inside the body 43 and the main flow of the water escapes axially through exhaust pipe 47. Water carrying particulates that have been spun by centrifugal force to the walls of the body 43 exits via a small tangential pipe 48. Water in the pipe 48 is passed down to a filter tape system 49 where it is sucked through a filter tape 50 by an underlying pipe 51 connected to a liquid suction pump 52. The pipes 48 and 51 are kept in close juxtaposition on either side of the filter tape 50, using an appropriate clamping and sealing mechanism in order to allow proper filtering of the stream of water through the filter tape. The filter tape 50 is stored on reel 53 and is fed past the pipes 48, 51 to a take-up reel 54. The take-up reel 54 is driven by an incremental motor which periodically advances the reel 54 at predetermined time intervals, depending on the speed of the boat and the density of the particulate material being collected. A cover tape 56 stored on a reel 55 is wound on top of the filter tape 50 as shown. The cover tape may also be of the filter type and saturated with an appropriate nutrient or life support solution to maintain alive micro-organisms trapped on the filter tape 50. The filter tape may be made of any conventional filter medium of suitable wet strength and capable of capturing particles of above about one micron in size. Systematic survey transverses may be carried out in the boat using electronic navigation means such as VLF radio positioning equipment. Fiducial markers may be printed on the tape which may be correlated with the course of the boat.

After completion of the survey the tape 50 is placed in an incubation chamber containing radioactive methane or radioactive ethane, and bacteria that are able to utilize these gases are allowed to multiply on the tape. After a suitable period of incubation (generally not less than 24 hours), the tape 50 is separated from its associated nutrient or cover tape and the radioactivity on the tape 50 monitored. The intensity of radiation emitted by the tape 50 is a function of the quantity of methane or ethane oxidizing bacteria that have been incubated on the tape. Automated monitoring equipment may be employed for measuring the radiation distribution along the tape 50. Identification and location of the collection points of methane and ethane oxidizing bacteria provides a sensitive indication of the presence of seepages of methane and ethane in the ocean or lake bottom floor. Economic oil and gas accumulations in sediments beneath the ocean floor are often accompanied by methane and ethane gas seeps.

As an alternative to microbiological incubation, a filter tape composed of glass fibres may be employed and the material collected on the tape 50 may be dried and analyzed by laser pyrolysis as previously described. Vapours generated by pyrolysis on the tape 50 can be passed through to a radio frequency quadrupole mass spectrometer for identification of specific compounds in order to determine the presence of hydrocarbon-utilizing bacteria and/or their metabolic by-products.

The marine embodiment of the invention may also be used for mineral exploration as well as hydrocarbon exploration. The invention is applicable to lakes in regions where there is very extensive lake coverage such as Canada. Under these conditions there is extensive drainage into the lakes from surrounding terrain and this drainage tends to carry particulate material from the streams and dissolved salts from mineralization. This particulate material carries a metal content expressive of mineralization and dissolved metals tend to be picked up in lakes by plankton living in these lakes as previously described. Some of these plankton and dissolved sediments are held in suspension in the surface waters and analysis of such suspended particulates provides an indication of mineralization either underlying the lake or in the surrounding terrain. Metals that can be detected this way include copper, lead, zinc, nickel, molybdenum, silver and uranium. The tape 50 can be analyzed for a plurality of elements in much the same fashion as for land operations. In addition, the sampling equipment may be installed in a float plane which can fly across the surface of the lake with its floats about 25-50 cm. above the water surface or on the surface itself, or the equipment can be mounted in a helicopter as shown in FIG. 9. The method is particularly advantageous in exploration for uranium lying beneath lakes, since conventional exploration methods which depend upon gamma-ray emission from uranium are inoperable over water due to the total masking effect of water on gamma-ray radiation.

When applying the invention on land where the terrain is too rough to be traversed by a vehicle, the equipment may be mounted in a helicopter. FIG. 9 illustrates apparatus used for this purpose. A helicopter 56 carries sampling equipment 57 similar to that illustrated in FIG. 4. Suspended beneath the helicopter 56 is a flexible plastic tube 58 that is connected to the helicopter by a friction fit connector 64. The plastic tube 58 extends through a heavy weight 59 as shown having a weight typically in the vicinity of 25 Kg. The suspended apparatus is supported by a thin stainless steel cable 60 which extends downwardly from a conventional cargo hook 61 beneath the helicopter 56, to an attachment point on the weight 59. The cargo hook 61 can be released electromagnetically so that the weight 59 can be released whereby the tube 58 detaches automatically from the friction connector 59. In addition, a shear pin is provided at the attachment point of the cable 60 to the cargo hook 61 so that the cable 60 and tube 58 will automatically break clear of the helicopter in the event the weight 59 becomes snagged. This arrangement provides for reasonable safety in the operation of the equipment.

The tube 58 extends through the weight 59 to a flexible extension tube 62 beneath the weight 59. The extension tube 62 terminates in a filter sieve 63 on the end of the tube 62, for filtering coarse material, e.g. of a size of above about 200 microns. In operation, the helicopter is caused to fly at such altitude that the weight 59 is clear of any obstructions and the tubing 62 is dragged along the ground. Dust from the surface is then sucked up through the sieve 63. A small microphone may be attached to the weight 59 to enable sound levels in the weight 59 to be monitored by the helicopter pilot. By this expedient it is possible to sense when the flexible tube 62 is banging on the ground and/or on vegetation. This arrangement, together with a radio altimeter enables the pilot to obtain a feeling of the performance of the suction system and to maintain appropriate flying height.

An important purpose of the weight 59 is to isolate the flexible tube 62 from the helicopter. Thus, if the tube 62 hits an obstruction and flys upwards it does so about the fulcrum provided by the weight 59 and does not fly up into the rotor blades.

Instead of being dragged along the ground, the tube 62 may be drawn across a canopy of trees whereby particulate material carried on the surface of the canopy of trees is drawn into the sampling system 57 through the tubes 62 and 58. This particulate material comprises organic material derived from the vegetation and contains elements which are indicative of the nutrient elements in the soil in which the vegetation is growing. Thus the method has utility in the exploration of heavily forested regions.

As used herein, the term "surficial layer", in the case of particles lying on the surface of the soil, means particles which are contained within approximately the top millimeter of the soil. In the case of particles suspended in water, "surficial layer" means particles which are located within about the top 5 centimeters of the water.

In the foregoing description, it was indicated that it is preferable, in the case of particles collected from the soil or vegetation, to grade the particles whereby the particles that are analyzed are primarily in the range of between about 50-200 microns. However, it will be understood that these limits, especially the lower limit, are not extremely critical. To the extent that particles below about 50 microns in size are collected, there will be an increasing influence in the measurements attributable to particulate matter which has migrated a considerable distance, and therefore to some extent the resulting measurements will be somewhat more diffuse than would be the case if the analysis were confined to the heavier particles. Regarding the upper end of the range, 200 microns is recommended as a practical maximum upper limit, although even in this case it will be understood that the exact diameter is not extremely critical.

What I claim is:
1. Geochemical prospecting apparatus comprising:
  a. means for collecting a plurality of samples primarily consisting of surficial particulates selected from at least one of the following sources:
    i. particulates lying on the surface of the soil,
    ii. particulates lying on transpiration surfaces of vegetation, and iii. particulates suspended in a body of water at the surface thereof,
b. said collecting means comprising an elongated flexible tube having an open end positioned in close proximity to the surficial particulates to be collected, and means for applying suction to said tube,
c. said collecting means including means for moving the collected particles in a fluid stream to a receiving station,
d. means for filtering the particles in said fluid stream so that the particles retained for analysis are primarily of diameters of below about 200 microns, and
e. means coupled to said collecting means for removing from the collected particles, particles primarily of sizes of below about 50 microns, whereby the particles retained for analysis are primarily between about 50 – 200 microns in size.

2. Apparatus as claimed in claim 1 wherein there is provided at the receiving station means for storing the collected particles comprising a tape, said tape being movable past said receiving station, means comprising a jet for directing said fluid stream containing said particles against said tape in the vicinity of said receiving station, said jet being separated from said tape by a predetermined distance whereby particles of sizes of below about 50 microns are swept away in a fluid stream issuing from said jet without being deposited on said tape and particles of above about 50 microns issuing from said jet tend to impact on said tape, and said tape being movable to expose fresh surfaces of said tape to said fluid stream at predetermined intervals, whereby the particles deposited on said tape may be stored for subsequent analysis.

3. Apparatus as claimed in claim 2 wherein means is provided for applying a cover tape to the tape containing said particulates, said cover tape being saturated with a nutrient capable of maintaining alive microorganisms collected on the said tape.

* * * * *